United States Patent
Ulkem et al.

(10) Patent No.: US 9,290,606 B2
(45) Date of Patent: Mar. 22, 2016

(54) MDI BASED LININGS AND MEMBRANES FROM PREPOLYMERS WITH VERY LOW FREE MONOMERIC ISOCYANATES

(75) Inventors: Ilhan Ulkem, Katy, TX (US); Adrian Ferguson Andrews, Hexham (GB); Michael Winter, Houston, TX (US)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 125 days.

(21) Appl. No.: 13/995,346

(22) PCT Filed: Dec. 19, 2011

(86) PCT No.: PCT/US2011/065768
§ 371 (c)(1),
(2), (4) Date: Jun. 18, 2013

(87) PCT Pub. No.: WO2012/087897
PCT Pub. Date: Jun. 28, 2012

(65) Prior Publication Data
US 2014/0342786 A1    Nov. 20, 2014

Related U.S. Application Data

(60) Provisional application No. 61/424,934, filed on Dec. 20, 2010.

(51) Int. Cl.
| C08G 18/72 | (2006.01) |
| C08G 18/76 | (2006.01) |
| C08G 18/78 | (2006.01) |
| F16M 11/04 | (2006.01) |
| F16M 11/14 | (2006.01) |
| F16M 13/00 | (2006.01) |
| F16M 13/02 | (2006.01) |
| H04M 1/04 | (2006.01) |
| B60R 11/02 | (2006.01) |
| H04M 1/02 | (2006.01) |
| B60R 11/00 | (2006.01) |

(52) U.S. Cl.
CPC .............. *C08G 18/725* (2013.01); *B60R 11/02* (2013.01); *B60R 11/0241* (2013.01); *C08G 18/7607* (2013.01); *C08G 18/7843* (2013.01); *F16M 11/041* (2013.01); *F16M 11/14* (2013.01); *F16M 13/00* (2013.01); *F16M 13/022* (2013.01); *H04M 1/0202* (2013.01); *H04M 1/04* (2013.01); *B60R 2011/0026* (2013.01); *B60R 2011/0056* (2013.01); *B60R 2011/0071* (2013.01); *F16M 2200/027* (2013.01)

(58) Field of Classification Search
CPC ............. C08G 18/725; C08G 18/7607; C08G 18/7843
See application file for complete search history.

(56) References Cited

U.S. PATENT DOCUMENTS

| 3,211,701 | A |   | 10/1965 | Miller et al. |
| 4,910,332 | A | * | 3/1990 | Kahl et al. ..................... 560/351 |
| 5,817,734 | A |   | 10/1998 | Pantone et al. |
| 5,925,781 | A | * | 7/1999 | Pantone et al. ................. 560/26 |
| 6,515,164 | B1 |   | 2/2003 | Bolte et al. |
| 2004/0084138 | A1 | * | 5/2004 | Henke et al. ............... 156/272.2 |
| 2008/0009592 | A1 |   | 1/2008 | Becker-Weimann et al. |
| 2009/0149621 | A1 |   | 6/2009 | Krause et al. |

FOREIGN PATENT DOCUMENTS

| DE | 19931997 A1 | 1/2000 |
| DE | 102004057292 A1 | 6/2006 |
| JP | 9-169828 A | 6/1997 |
| WO | WO99/47577 A1 | 9/1999 |

OTHER PUBLICATIONS

English Abstract of DE19931997A1.
English Translation of JP09169828.
International Search Report and Written Opinion of corresponding PCT Application No. PCT/US2011/065768 mailed Apr. 25, 2012.

* cited by examiner

*Primary Examiner* — Michael L Leonard
(74) *Attorney, Agent, or Firm* — Norris McLaughlin & Marcus, P.A.

(57) ABSTRACT

The present invention relates to a two part polyurethane and/or polyurethane polyurea hybrid based system for making an elastomeric material, comprising an Iso part having low free monomer and an amine/polyol part, wherein the Iso part comprises a pre-polymer of polyurethane, and wherein the pre-polymer is an MDI based pre-polymer with low free MDI monomer and capped with isocyanate groups from a second relatively higher vapor pressure isocyanate and the pre-polymer contains less than about 0.3% total free monomer and has an NCO % in the range of about 0.1 to about 10%.

10 Claims, No Drawings

MDI BASED LININGS AND MEMBRANES FROM PREPOLYMERS WITH VERY LOW FREE MONOMERIC ISOCYANATES

The present case is based on International patent application No. PCT/US2011/065768 filed on Dec. 19, 2011, which claims priority of U.S. provisional patent application No. 61/424,934 filed Dec. 20, 2010.

BACKGROUND OF THE INVENTION

The present invention relates to elastomeric and/or plastic like membranes or linings. Some of these types of materials/products in the industry have previously been made by using isocyanate chemistry. Examples of products using isocyante chemistry include pure polyurethanes or pure polyureas or a hybrid of both polyurethanes and polyureas. These products typically consist of two components and are made by mixing part A with part B of the product at the time of use. One part is usually referred to as the Iso part, containing an isocyanate material, while the other part is usually referred to as the amine/polyol part, containing a polyol, amine or a combination of a group of compatible active hydrogen containing materials. An Iso component commonly used by the industry is methylene diphenyl diisocyanate (MDI) monomer or a combination of an MDI monomer and MDI polymer/oligomer. In general, the understanding in the industry is that a better product (e.g., having better mechanical performance and chemical resistance) is obtained when monomeric MDI alone or sometimes in combination with polymeric MDI is utilized in one part of the product in conjunction with an aromatic di-amine in the other part of the product. The use of such materials in the industry is generally known as producing products with good water permeation resistance and chemical resistance along with good corrosion resistance and mechanical performance. The use of monomeric MDI in such systems has been suggested to help reduce the viscosity, adjust the reaction speed, and obtain better cross-linking to provide both good mechanical and chemical properties of the final products.

However, the use of monomeric MDI, due to it being a monomer, has potentially negative health and safety concerns. This is generally the case for almost all monomeric isocyanate systems. In this regard, it would be beneficial to make a product with very low (or no) free monomer in it while still achieving the desired mechanical, chemical and application performance objectives. It would also be advantageous from a toxicological standpoint if such a product contained no aromatic diamine in its amine/polyol part due to potential generation of species from the aromatic diamines which have been reported to be carcinogenic.

In such a situation, where the Iso part contains no (or very low) monomeric material and the amine/polyol part is free of aromatic diamine, it is generally believed that the properties of the material, including the reaction speed are detrimentally affected. Thus, there is a need to achieve desired properties at reaction speeds that are similar to that of the products made by the use of free monomeric MDI and aromatic di-amine. As a result, it would be advantageous to obtain the desirable product properties, without using the common materials, as discussed above, particularly if those products can also be made working at similar reaction speeds and application conditions with the commonly used materials.

SUMMARY OF THE INVENTION

In accordance with the present invention, it has now been found that linings and membranes can be made while avoiding the difficulties associated with both the use of MDI monomers and aromatic diamines mentioned above. In one aspect, the invention is directed to a two part system for making a lining material, which includes an Iso part having very low free monomer as isocyanate and an amine/polyol part without the use of an aromatic di-amine thus negating the toxic and hazardous nature of using high levels of free isocyanates and aromatic di-amines.

In one aspect, the Iso part comprises a pre-polymer of polyurethane. In one embodiment, the pre-polymer is an MDI based pre-polymer with substantially no or no free MDI monomer and capped with toluene diisocyanate (TDI) groups. In another embodiment, the pre-polymer can be capped with isophorone di isocyanate (IPDI). In an embodiment, the pre-polymer contains less than 0.3 wt % free total isocyanate monomer, or less than 0.2 wt % total isocyanate monomer, or less than about 0.1 wt % free monomer, or less than about 0.05 wt % free monomer, i.e., total monomer including free TDI monomer. In one embodiment, the pre-polymer contains less than 0.2 wt %, or less than 0.1 wt %, or less than 0.05 wt %, or less than 0.025 wt %, or substantially no free MDI monomer in combination with low total free monomer.

In another embodiment, the pre-polymer has an NCO % in the range of from about 0.1 to about 10%, or about 0.5 to about 5%, or about 1 to about 4%, or about 2 to about 3%.

In one embodiment, the Iso part further comprises an additional isocyanate. In an embodiment, the additional isocyanate can be chosen from an HDI trimer, an IPDI, a tetramethyl xylylene di-isocyanate (TMXDI), a cyclo aliphatic di-isocyanate such as Desmodur W, or combinations thereof. In one embodiment, the additional isocyanate trimer is a hexamethylene diisocyanate (HDI) trimer. In an embodiment, the ratio of the MDI based pre-polymer to the additional isocyanate is in the range of from about 0.5 to about 1.4, or from about 0.6 to about 1.2, or 0.7 to about 1.1.

In one embodiment, the amine/polyol part comprises polyols chosen from a blend of polyester/polyether polyols. The polyols can be diols, triols or tetraols, having primary, secondary and/or tertiary alcohol groups, or combinations thereof. In one embodiment, the polyol is a branched polyester and polyether based polyol with a functionality of 3.5 with all of the alcohol functional groups made of secondary hydroxyls.

In one embodiment, the amine/polyol part further comprises a secondary amine. In an embodiment, the secondary amine can be chosen from Desmophen NH1220, NH1420 or NH 1520 or combinations thereof.

In another embodiment the polyol can be a caprolactone based polyol with all hydroxyl groups being primary alcohols while the secondary amine is still chosen from one of the Desmophen series mentioned above. In such an embodiment the polyol can be multifunctional or a combination of different multifunctional polyols.

In an embodiment, the polyol can be chosen from a di-functional, tri-functional, tetra-functional or combinations thereof. It is also possible that instead of one type of polyol a blend of various types of polyols are used.

The present invention provides the advantage of producing linings and membranes without the drawbacks associated with a two part polyurethane (or polyureas) containing free MDI monomer and aromatic di-amines whilst still enabling the desired performance features achievable at reaction speeds comparable to that of the ones achieved by using such common materials.

Additional objects, advantages and novel features of the invention will be set forth in part in the description and examples which follow, and in part will become apparent to those skilled in the art upon examination of the following, or may be learned by practice of the invention. The objects and advantages of the invention may be realized and attained by means of the instrumentalities and combinations particularly pointed out in the appended claims.

DETAILED DESCRIPTION OF THE INVENTION

In one embodiment, the MDI based pre-polymer is prepared by first reacting MDI monomer with a polyol in such a way that the consumption of all or substantially all monomeric MDI is insured by using excess polyol in the system. In one embodiment the polyol used for making the prepolymer is a difunctional polyol.

The pre-polymer can then be reacted with another isocyanate having a relatively higher vapor pressure to cap or attach the additional isocyanate to the ends of the MDI prepolymer chains. In one embodiment, the vapor pressure of this second isocyanate is sufficiently high so that unreacted isocyanate can be stripped out from the reaction mixture to achieve a total free isocyanate content of less than 0.3 or less than 0.2 wt % after stripping under vacuum. In one embodiment, the additional isocyanate, which is attached to the end of the pre-polymer chains, can be chosen from toluene diisocyanate (TDI), isophorone diisocyanate (IPDI), tetramethyl xylylene diisocyanate (TMXDI), cycloaliphatic diisocycnates (t-CHDI), Xylene diisocyanate (XDI), Methylene Dicyclohexyl Diisocyanate (H12MDI), or mixtures thereof. In one embodiment, the additional isocyanate is TDI.

In one embodiment, the relatively high vapor pressure isocyanate, e.g. TDI, is vacuum stripped from the resulting prepolymer reaction mixture to remove excess monomeric isocyanate. In one embodiment, where TDI is used, the final pre-polymer product contains less than about 0.3% monomeric TDI with no (or substantially no) free monomeric MDI in it. In one embodiment, the resultant product, an MDI based PU capped with a second isocyanate, e.g., TDI, at the end of the polymer chains, has an NCO % in the range of about 0.1 to about 10%, or about 0.5 to about 5%, or about 1.5 to about 3.5%, or about 2 about 3%, or about 2.5%.

This level of NCO for the pre-polymer was found to produce a final product with the added performance features of the prepolymer itself but also with limited network formation and/or cross-linking ability for achieving higher levels of mechanical performance and chemical resistance. However, the pre-polymer made in this way was found to be a very suitable toughening agent with the ability of being covalently; hence, chemically bonded to other species in the system of the final product.

In another embodiment, the Iso part further comprises one or more additional isocyanates, e.g., a trimer of HDI, capable of providing increased reactivity and multi functionality for achieving a higher cross-linking level. In an embodiment, the pre-polymer material has very low monomeric free isocyanate in it (e.g., less than 0.3%). This way a part of a two component material is provided which contains a reactive toughening agent (TDI capped MDI based polyurethane prepolymer) and a lower viscosity but multiple functional material (e.g., trimer HDI). The inventors have found that desired reaction speeds with the desired potential crosslink density are achievable and controllable by the use of such a system in the iso part of the final product.

It is believed that the reactive end groups of the pre-polymer according to the invention enable its use as a reactive material, which eliminates the possibility of phase separation by migrating to the surface of the final product like a non-reactive plasticizer. The chemical stability of the prepolymer with the other isocyanate contributes to making a relatively stable part A with very low total free monomer (e.g., less than about 0.3%).

In addition to being chemically stable, the inventors have found that the use of the additional isocyanate (e.g., HDI trimer), in combination with the pre-polymer according to the present invention, results in increased reaction speed and formation of a three dimensional network dense enough for both good mechanical performance and chemical resistance, while also contributing to good application performance by the reduced viscosity, a contribution attributed to the added isocyanate, e.g., HDI trimer. Furthermore, it is believed that the prepolymer acts as a reactive toughening agent, which results in a final product capable of distributing the internal stresses during both curing and service conditions of the final product. Thus, it is believed that the pre-polymer according to the invention, being substantially free of free isocyanate monomer, is very useful in combination with other materials for achieving multiple product performance characteristics at the same time.

The amine/polyol part of the system according to the invention also contributes to achieving desired reaction speeds and cross-linking density at the same time, but without the use of an aromatic di-amine. In one embodiment, such a result is obtained by using a polyether-polyester based branched polyol. In one embodiment, the polyol has 2 to 5, or 3 to 4 functionality. In embodiments, the molecular weight of the polyol varies from 800 grams/mole to 1800 grams/mole. In embodiments, the viscosity of this polyol can be around 2800 to 4000 cps at 25° C.

It is believed that the polyether portion of the polyol contributes to the desired chemical resistance due to its lack of reactive species on its backbone, while the dominant contribution of polyester portion is believed to be improve the strength. It is believed that the polyether and polyester components of the polyol, along with the functionality, all contribute to the mechanical performance, chemical resistance, crystallinity, toughness and reactivity of the system. In an embodiment of the invention, the polyol is a branched polyol. It is believed that the branched structure of the polyol, along with the other features mentioned above, also contributes to the Tg of the system.

In another embodiment, the amine/polyol part further comprises a secondary amine. It has been found that the use of a secondary amine in connection with the present invention achieves cure rates that are not too fast, which (if too fast) could prevent other available active species from having a chance to react, permitting the products to set at an acceptable speed and providing more controlled application and wetting on substrates.

In one embodiment, all of the materials described above are utilized in the present invention, such as the Iso part containing a low monomer, free MDI based, TDI capped low isocyanate content polyurethane prepolymer, and an HDI trimer, in combination with the amine/polyol part containing a branched polyether and polyester based polyol based system and the secondary amine, in quantities to provide a stoichiometry index in the range of 0.1 to 2, or 0.25 to 1.5, or 0.75 to 1.25 of the equivalent weights, resulting in a hybrid Polyurea-Polyurethane product with no solvent in it.

The final product obtained, when prepared as described above, provides tensile strength, elongation % and chemical resistance values at least comparable to those made by the use of free MDI monomer and aromatic di-amine containing systems. Such a two part system according to the present invention achieves desired performance requirements for commercial membranes and linings without having free monomeric MDI and without using any aromatic di-amine.

The components of the present invention may optionally be reacted in the presence of a polyurethane catalyst. Suitable polyurethane catalysts are conventional and may be utilized in conventional, amounts.

Various types of crosslinkers which can be used include but are not limited to are isocyanates, blocked isocyanates, and/or other cross linkers which are reactive toward polyols and/or amines.

The coating composition of the present invention may also include from about 1 to about 50 weight percent of a resin (binders) such as acrylics, polyesters, alkyds, phenolics, epoxies, polyethers, polyurethanes, and mixtures thereof.

The coating compositions described herein can be used as primers, basecoats, topcoats, intermediates and clear coats, but are preferred as topcoats with or without the use of primers on both metal and concrete substrates.

Optionally, pigments may be present in the coating composition of the present invention. Useful pigments are various types common to the art which include but are not limited to titanium dioxide, graphite, carbon black, zinc oxide, calcium sulphide, chromium oxide, zinc sulphide, zinc chromate, strontium chromate, barium chromate, yellow nickel titanium, yellow chromium titanium, red iron oxide, yellow iron oxide, black iron oxide, naphtol red and browns, anthraquinones, dioxa zinc violet, isoindoline yellow, arylide yellow and oranges, ultramarine blue, phthalocyanine complexes, amaranth, quinacridones, halogenated thioindigo pigments, extender pigments such as magnesium silicate, aluminium silicate, calcium silicate, calcium carbonate, fumed silica, barium sulfate, and zinc phosphate.

The coating compositions of the present invention may also comprise additional components such as solvents, catalysts, stabilizers, fillers, rheology control agents, flow additives, leveling additives, dispersing agents and other components known to persons skilled in the art.

The coating compositions of the present invention may be applied to any number of well known substrates by employment of plural component high pressure spray application technique. One preferred substrate is metals. Another preferred substrate is concrete objects/structures. Curing of the coatings may be conducted under a variety of conditions known to a person skilled in the art, although curing of the above-described two-component systems is preferably carried out under ambient temperature conditions, typically from ambient to about 40° C.

The compositions are particularly suitable in the protective coating industry, in particular metal and mining industry, water and waste water markets, industrial machinery applications, and construction industries in general for the purpose of protecting both metal and concrete substrates.

The preferred application technique of the present invention is the use of a plural component machine at conventional higher pressures. The technique also utilizes a set of static mixers and the application is made at a volumetrically 1 to 1 ratio. The technique also utilizes heat for both controlling the viscosities, stable spray conditions and desired curing speeds.

The foregoing general discussion of the present invention will be further illustrated by the following specific but non-limiting examples.

The following examples include the preparing Iso and polyol/amine parts in a two part system and the use of the system in coatings, according to the present invention. Performance testing of lining/membrane material produced according to the invention is also included.

Methods

In the Examples set forth below, the tension and elongation tests were conducted according to ASTM D-412. The chemical resistance tests were conducted using a test method that is very similar to that of the ASTM D-543. Adhesion tests were performed by employing ASTM D-4541 type 4 test method. The abrasion tests were conducted according to ASTM D4060. The impact test performance was evaluated by using a method that is very similar to that of the ASTM G-14.

The chemical resistance of the products against some chemicals were evaluated by immersion of the specimens into liquid chemical agents. This has actually been an indirect measure of the required cross link density.

EXAMPLES

Example 1

An Iso part of a two part polyurethane and/or polyurethane polyurea hybrid system was prepared by combining 18 grams of an MDI based pre-polymer with 25 grams of an HDI trimer (XP-2410 from Bayer). The MDI based pre-polymer used was the reaction product of a di-functional polyol and MDI, end capped with TDI, having substantially no free MDI monomer, less than 0.1% total free monomer and an NCO % of 2 to 3%. The pre-polymer/trimer combination was mixed in a first small closed container for 2 minutes at approximately 1500-2000 RPM speed using a gyro mixer.

Example 2

An amine/polyol part of a two part polyurethane and/or polyurethane polyurea hybrid system was prepared by combining 10 grams of branched polyether-polyester based polyol (Sovermol 1080) (11.6%) with 33.5 grams of secondary amine (Bayer NH-1420) (38.7%). The polyol/amine combination was mixed in a second small closed container for 2 minutes at approximately 1500-2000 RPM speed using a gyro mixer.

Example 3

A test coating was prepared by pouring the contents of the second container into the first container and then mixing for approximately 1.5 to 2 minutes at approximately 1500-2000 RPM speed using a gyro mixer. The resulting mixture was poured on a horizontal Teflon plate (approximately 25 cm by 25 cm) and allowed to spread evenly (about 3 mm thickness) with no pinholes and then was cured at ambient temperature. After about one week samples were cut from the cured coating for the testing described in example 5 below.

Example 4

Additional test samples were prepared by spraying elastomeric coatings onto both primed and un-primed metal and concrete substrates. The spaying equipment utilized two static mixers each containing 12 elements during the spray application. Iso component similar to Example 1 was heated to 32° C. (90° F.) and Polyol/amine component similar to Example 2 was heated to 21° C. (70° F.). Pressure during the spray was around 2800-3000 psi. The size of the spray gun tip used was 0.021". Outside temperature where the metal and concrete substrates were kept during the application was 13° C. (55° F.). Some of the metal and concrete substrates were primed with Interseal 1036 (24 hours prior to the application) whereas other substrates were used as direct to metal and direct to concrete applications. The roughness of the metal substrates was around 1.5 mils.

Example 5

The test samples from Examples 3 and 4 were subjected to various tests, the results of which are shown in the tables below. * indicates test samples produced according to Example 3 and *** indicates test samples produced according to Example 4.

The initial performance characteristics of this test samples are shown below in table 1.

TABLE 1

Initial tests.

| Test type | Test Results |
| --- | --- |
| Solids Content | 100% solids |
| VOC | Zero |
| Maximum build | Unlimited |
| Film Shrinkage (product is 100% solid, no shrinkage due to volume solids, there may only be a wet to dry shrinkage) | Zero |
| Tensile Strength (ASTM D-412 C)* | 2662 psi |
| Elongation % (ASTM D-412 C)* | 66% |
| Hardness Shore D @ 69° F. (20.5° C.)* | 60 to 65 |
| Hardness Shore D @ 69° F. (20.5° C.)*** | 58 to 63 |
| Abrasion resistance (ASTM D-4060) 1000 revolution, 1000 grams load with CS17 wheel* | 74.4 mg |
| Impact Resistance*** (Similar to ASTM G-14 or Mil 24667 Sample thickness was ~2 mm (~1/3$^{rd}$ of the thickness for measurements) | 192 lbs. inch |
| Adhesion (Direct to metal)*** | 1204 psi (average of 3 measurements only) |
| Adhesion (Metal with primer Interseal 1036)*** | 905 psi (average of 3 measurements only) |
| Adhesion (Direct to concrete)*** | 1086 psi (average of 3 measurements only) |
| Adhesion (Concrete with primer Interseal 1036) *** | 987 psi (average of 3 measurements only) |

The chemical resistance of the test samples is shown below in the table 2.

TABLE 2

Immersion tests.

| Chemical | Weight Change % |
| --- | --- |
| Immersion in water (ASTM D-543 - 1 month of immersion)* | ~1.2% |
| Immersion in 10% HCl (ASTM D-543 - 1 month of immersion)* | ~0.4% |
| Absorption in 20% NaOH (ASTM D-543 - 1 month of immersion)* | ~0.1% |
| Absorption in 30% $H_2SO_4$ (ASTM D-543 - 1 month of immersion)* | ~0.3% |
| Absorption in 50% $H_2SO_4$ (ASTM D-543 - 1 month of immersion)* | ~24.7% |

We claim:

1. A two part polyurethane and/or polyurethane polyurea hybrid based system for making an elastomeric and/or plastic like material, comprising an Iso part and an amine/polyol part, wherein the Iso part comprises a diphenylmethane diisocyanate (MDI) based pre-polymer capped with isocyanate groups from toluene diisocyanate (TDI), wherein the pre-polymer has less than about 0.3% total free monomer and an NCO % in the range of about 0.1 to about 10%.

2. A two part polyurethane and/or polyurethane polyurea hybrid based system according to claim 1 wherein the pre-polymer contains substantially no free MDI monomer.

3. A two part polyurethane and/or polyurethane polyurea hybrid based system according to claim 1 wherein the pre-polymer has an NCO % in the range of about 0.5 to about 5%.

4. A two part polyurethane and/or polyurethane polyurea hybrid based system according to claim 3, wherein the pre-polymer has an NCO % in the range of about 1 to about 4%.

5. A two part polyurethane and/or polyurethane polyurea hybrid based system according to claim 1 wherein the amine/polyol part comprises at least one polyol chosen from polyester and/or polyether polyols.

6. A two part polyurethane and/or polyurethane polyurea hybrid based system according to claim 5, wherein the at least one polyol chosen from polyester and/or polyether polyols is a branched polyester and polyether based polyol.

7. A two part polyurethane and/or polyurethane polyurea hybrid based system according to claim 5, wherein the amine/polyol part further comprises a secondary amine.

8. A two part polyurethane and/or polyurethane polyurea hybrid based system according to claim 1 wherein the Iso part further comprises an HDI trimer.

9. A coating composition comprising the two part polyurethane system according to claim 1.

10. A two part polyurethane and/or polyurethane polyurea hybrid based system according to claim 6 wherein the amine/polyol part further comprises a secondary amine.

* * * * *